PLATE CURVING PROCESS

Filed May 3, 1947

INVENTOR
Henry Oettinger, Jr.
BY
Morgan, Finnegan and Durham
ATTORNEYS

Patented Aug. 8, 1950 2,517,701

UNITED STATES PATENT OFFICE 2,517,701

PLATE CURVING PROCESS

Henry Oettinger, Jr., Forest Hills, N. Y., assignor to Electrographic Corporation, New York, N. Y., a corporation of Delaware Application May 3, 1947, Serial No. 745,844

2 Claims. (Cl. 18—56)

The present invention relates to a novel and improved process of forming curved printing plates for use on rotary printing presses.

Objects and advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention, and together with the description, serve to explain the principles of the invention.

Figure 1:
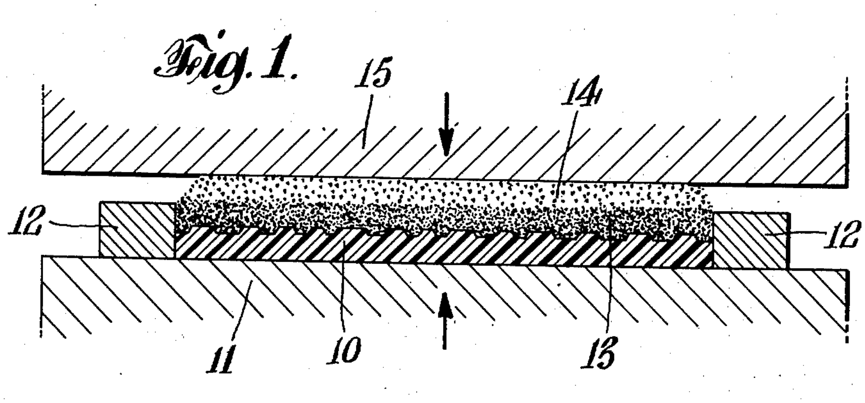
Figure 1 is a diagrammatic sectional view showing the formation of a printing plate to be used in the process of the present invention.

The present invention has for its object the provision of a novel and improved process for producing curved parti-cylindrical printing plates from thermoplastic resins for rotary letterpress printing. A further object is the provision of an improved process of curving printing plates formed from vinyl resins so that the plates may be used on printing press cylinders with conventional plate-holding means.

In accordance with the present invention, the printing plate is formed from a thermoplastic resinous material, preferably a copolymer of vinyl chloride-vinyl acetate, the face of the printing plate being formed from an unfilled resin which is relatively hard, while the remainder of the plate is formed from a slightly softer resin which may contain a large portion of filler. The printing plate is preferably formed by filing the indentations of a matrix with a relatively fine powder of the unfilled resin, while the remainder of the thickness of the plate is formed from the coarser particles of the somewhat softer filled resin. The matrix, which may be of a phenol-formaldehyde resin fully set, is placed on the lower platen of a heated hydraulic press and the matrix is surrounded by bearer bars of the proper thickness so that when the upper heated platen of the press is pressed against the powdered resin, the resin will be forced into the mold and compacted by the heat and pressure into a unitary mass, the thickness of the plate being determined by the thickness of the matrix and the greater thickness of the surrounding bearers. When the plate has been fully formed, the matrix and plate are removed from the press and allowed to cool, thereby yielding a flat printing plate of the desired thickness. The plate is then trimmed to the proper dimensions after which the plate is heated by immersion in a liquid bath which does not attack the thermoplastic material until the plate has attained a temperature of from 200° F. to 225° F., the exact temperature depending upon the precise thermal properties of the resin used. While the plate is thus heated it is laid on a heated rigid form of the desired curvature and is gently pressed to conform to the general shape of the exterior of the curved surface. Preferably the curved surface is provided around the plate with a frame of the same thickness as the thickness of the plate, so as to accurately locate the plate on the cylinder, insure that the straight edges of the plate are parallel to the axis of the cylindrically curved surface, and that the curved edges lie in a plane perpendicular thereto. The plate is then covered with an air-tight yielding member such as a rubber blanket which also overlies the frame member surrounding the plate, and forms with the frame member an air-tight chamber containing the plate on the cylinder surface. The ends of the blanket are preferably held under some degree of tension so as to assist in conforming the plate to the curvature of the cylinder. With the plate and blanket in this position, suction is applied to the interior of the cylindrical surface, and is communicated to the underside of the blanket by means of holes through the cylindrical member, thereby firmly holding the plate closely to the cylinder and accurately conforming the interior of the cylindrical plate to the exterior of the cylindrical surface. During this portion of the operation the cylindrical surface is preferably heated so that the plate does not cool too rapidly, but after the suction has been fully applied to the blanket, the cylindrical member is rapidly cooled, as by the circulation of water through it, and the plate is allowed to remain in contact with the cylinder, while still subjected to suction until the plate has cooled sufficiently so that it has assumed a permanent shape. When the plate has cooled, substantially below 120° F., the suction may be relieved, the blanket removed from the plate, and the plate may then be removed from the cylinder, having assumed its final cylindrical shape.

It will be understood that the foregoing general description and the following detailed description as well are explanatory of the invention but are not restrictive thereof.

Referring now in detail to the illustrative and preferred manner of carrying out the process of the present invention as shown in the accompanying drawings, Figure 1 illustrates the formation of the printing plate from the thermoplastic resin. A matrix 10, preferably of fully set phenol formaldehyde thermosetting resin, is positioned on the lower platen 11 of a heated press such as a hydraulic press capable of exerting relatively heavy pressure. This matrix is generally of the thickness approximating ¼". The matrix is surrounded by closely fitting bearer bars 12 having a thickness equal to the combined thickness of the finished plate and matrix, the bars 12 forming a closed area the bottom of which is completely filled by the matrix 10. The upper face of the matrix carrying the molded impression of the original printing plate to be reproduced is then filled with a thin layer 13 of a relatively fine powdered thermoplastic resin which has considerable rigidity after molding, preferably a vinyl acetate-vinyl chloride copolymer of relatively high molecular weight and preferably not mixed with any filler. One thermoplastic resin which I have found to be particularly desirable for this purpose is sold by Carbide & Carbon Chemicals Corporation under the trade name of "Vinylite BKP 50" and is a vinyl acetate-vinyl chloride copolymer containing 90% vinyl chloride and stated to have a molecular weight of approximately 16,000.

After the layer of relatively fine powdered resin has been smoothed over the surface of the matrix, a second and thicker layer 14 of relatively coarse powdered thermoplastic resin is placed over the layer 13, and the layer 14 is likewise smoothed to a substantially uniform thickness. The layer 14 may be of a thermoplastic resin similar to that in the layer 13 except that the coarse powdered resin preferably contains a considerable amount of filler. The thickness of the layers 13 and 14 is ordinarily two or three times as thick as the eventual thickness of the printing plate after moulding, but the quantity of powder is gauged, as by weighing, so that there is only a slight excess of powder overlying the matrix. Preferably the thermoplastic powdered resins are heated before they are positioned on the matrix so as to shorten the time required for pressing and completing the formation of the plate.

After the layers 13 and 14 have been properly arranged, the upper platen 15 of the heated press is forced downwardly to compact the powdered resin in layers 13 and 14, and this pressure is maintained for a period of time sufficient to heat the powdered resins and cause them to coalesce into a unitary mass which forms the printing plate reproducing the design of the matrix 10.

Figure 2:
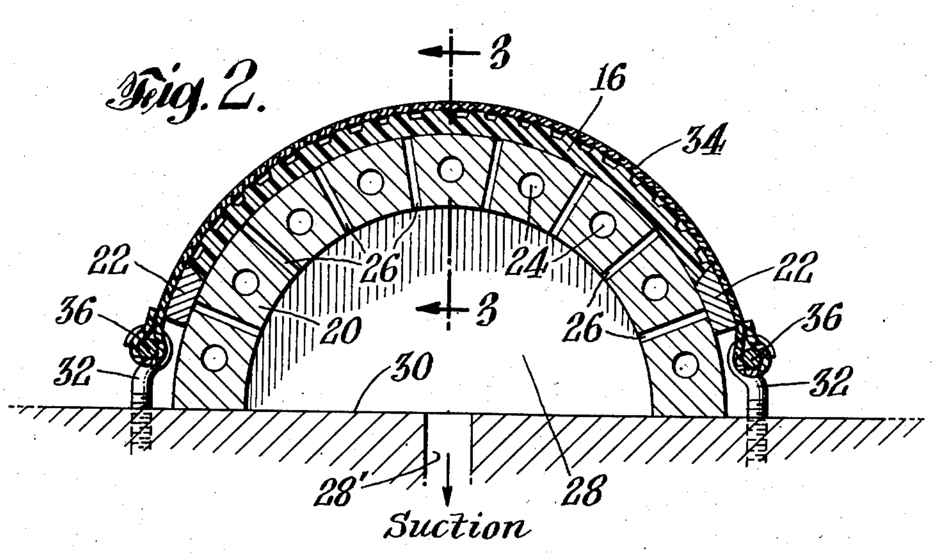
Figure 2 is a diagrammatic sectional view showing a further step in the formation of the printing plate in accordance with the present invention.
Figure 3:
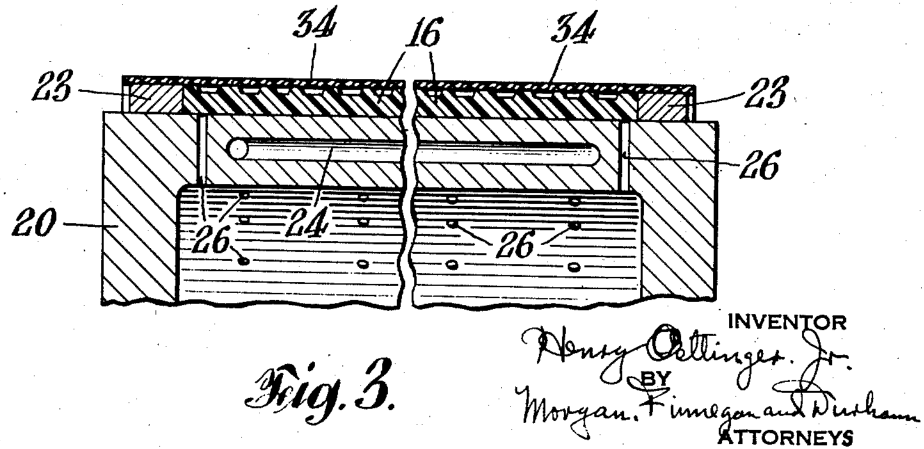
Figure 3 is a sectional view taken on the line 3—3 of Figure 2.

The printing plate so formed is then uniformly heated to a temperature sufficient to give it considerable flexibility and for this purpose the plate is immersed in an oil or water bath heated to the desired temperature which is generally between 200° and 225° F. When the plate has assumed the desired temperature it is removed from the bath, the liquid drained from it and the plate is then positioned on the cylindrical form shown in Figures 2 and 3. This form comprises a relatively heavy, convex particylindrical arch 20 formed of metal and sufficiently strong to resist bending. On the exterior surface of the arch 20, which is of the correct diameter to correspond to the diameter of the printing cylinder on which the plate is to be eventually mounted for printing, is provided a marginal frame formed of straight bars 22 and curved bars 23, these bars defining a rectangular area on the surface of the cylinder and being of the same shape and area as the printing plate 16. Bars 22 and 23 are of a thickness substantially the same as the thickness of the plate 16 so as to prevent damage to the marginal portions of the plate 16. Arch 20 is provided with internal passageways 24 through which heating or cooling fluid may be circulated, these passageways being connected to each other and to a suitable source of supply.

Means are provided on the arch 20 for applying suction to the exterior of the arch and beneath the plate 16 so that the plate 16 may be held against the arch in curved position. For this purpose the arch is provided with ducts 26 which lead from its exterior surface to the interior surface and communicate with a suction or vacuum pump applying suction or vacuum to the interior space 28 within the arch. The arch 20 is mounted on a heavy surface 30 such as a table, at its four corners are adjusting hooks 32 or other anchoring means to which a blanket may be attached. The blanket 34 is formed of impervious, flexible material such as a rubber impregnated fabric of sufficient size to cover the plate 16 and the margin bars 22 and 23. The ends of the blanket are attached to rods 36 which rods extend beyond the ends of the blanket and may be anchored in the open portion of the hooks 32, thereby slightly tensioning the blanket and holding it securely over the plate at the same time maintaining the plate substantially in contact with the outer surface of the arch 20. After the plate 16 has been applied to the arch and conformed generally to the surface of the arch, suction is applied through the duct 28' and the ducts 26 so as to firmly hold the plate in its cylindrically curved shape. The application of the blanket 34 assists in preliminarily holding the plate to the surface of the arch, and also insures a tight seal around the margins of the plate, so as to prevent excessive leakage of air through the ducts 26.

The plate is held in this position for a short period of time and while the suction is continued, cooling fluid is flowed through the passageways 24 so as to cool the arch 20 as well as the plate 16. When the plate 16 has been sufficiently cooled, for instance below 120°, the suction is discontinued, the blanket 34 is released from its anchoring means and the plate 16 may be removed from the arch having assumed a final curve shape such as it will have when applied to the printing cylinder for printing.

The invention in its broader aspects is not limited to the specific mechanisms shown and described but departures may be made therefrom within the scope of the accompanying claims without deeparting from the principles of the invention and without sacrificing its chief advantages.

What is claimed is:

1. The process of producing curved printing plates formed from thermoplastic resin which comprises trimming a printing plate to the desired size, heating the plate to render it pliable, positioning the plate within a curved frame on a convex cylindrical surface of the desired diameter, covering the plate and frame with an impervious blanket, applying suction to the plate and blanket to hold the plate firmly against the cylindrical surface and cooling the plate while maintaining the suction on the plate.

2. The process of producing curved printing plates formed with thermoplastic resin which comprises trimming a printing plate to the desired size, heating the plate to render it pliable, positioning the plate within a curved frame on a convex cylindrical surface of the desired diameter, stretching an impervious blanket over the face of the plate and the frame, applying suction to the plate and blanket to hold the plate firmly against the cylindrical surface and cooling the plate while maintaining the suction on the plate.

HENRY OETTINGER, Jr.

REFERENCES CITED

The following references are of record in the file of this patent:

UNITED STATES PATENTS

| Number | Name | Date |
|---|---|---|
| 1,857,842 | Goldenbaum | May 10, 1932 |
| 2,304,663 | Smith et al. | Dec. 8, 1942 |
| 2,354,916 | Hurt | Aug. 1, 1944 |
| 2,377,946 | Leary | June 12, 1945 |
| 2,380,573 | Beasecker | July 31, 1945 |
| 2,422,979 | Pecker | June 24, 1947 |
| 2,441,097 | Hicks | May 4, 1948 |

FOREIGN PATENTS

| Number | Country | Date |
|---|---|---|
| 501,641 | Great Britain | Feb. 28, 1939 |